Aug. 1, 1967  G. L. DE RIDDER  3,333,382
PANEL SUPPORTING FRAME STRUCTURES WITH
INSULATING AND FASTENING STRIPS
Filed Nov. 25, 1964  2 Sheets-Sheet 1
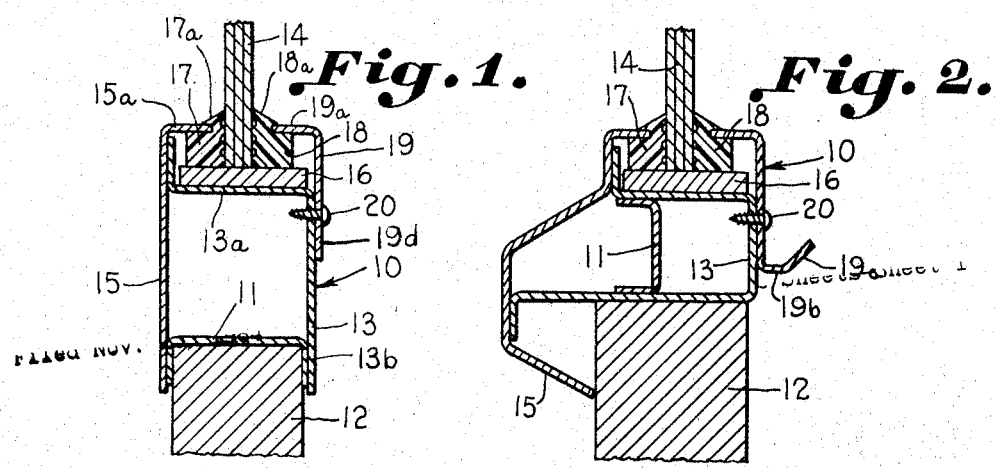
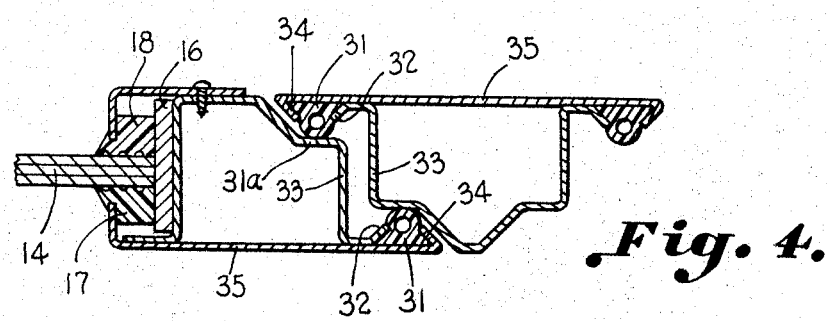
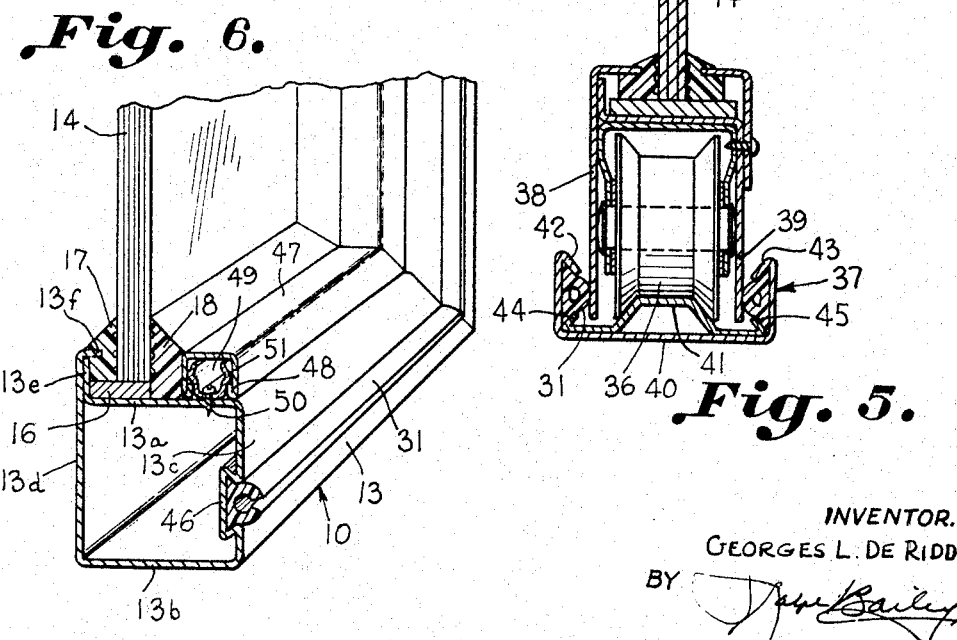
INVENTOR.
GEORGES L. DE RIDDER
BY
ATTORNEY

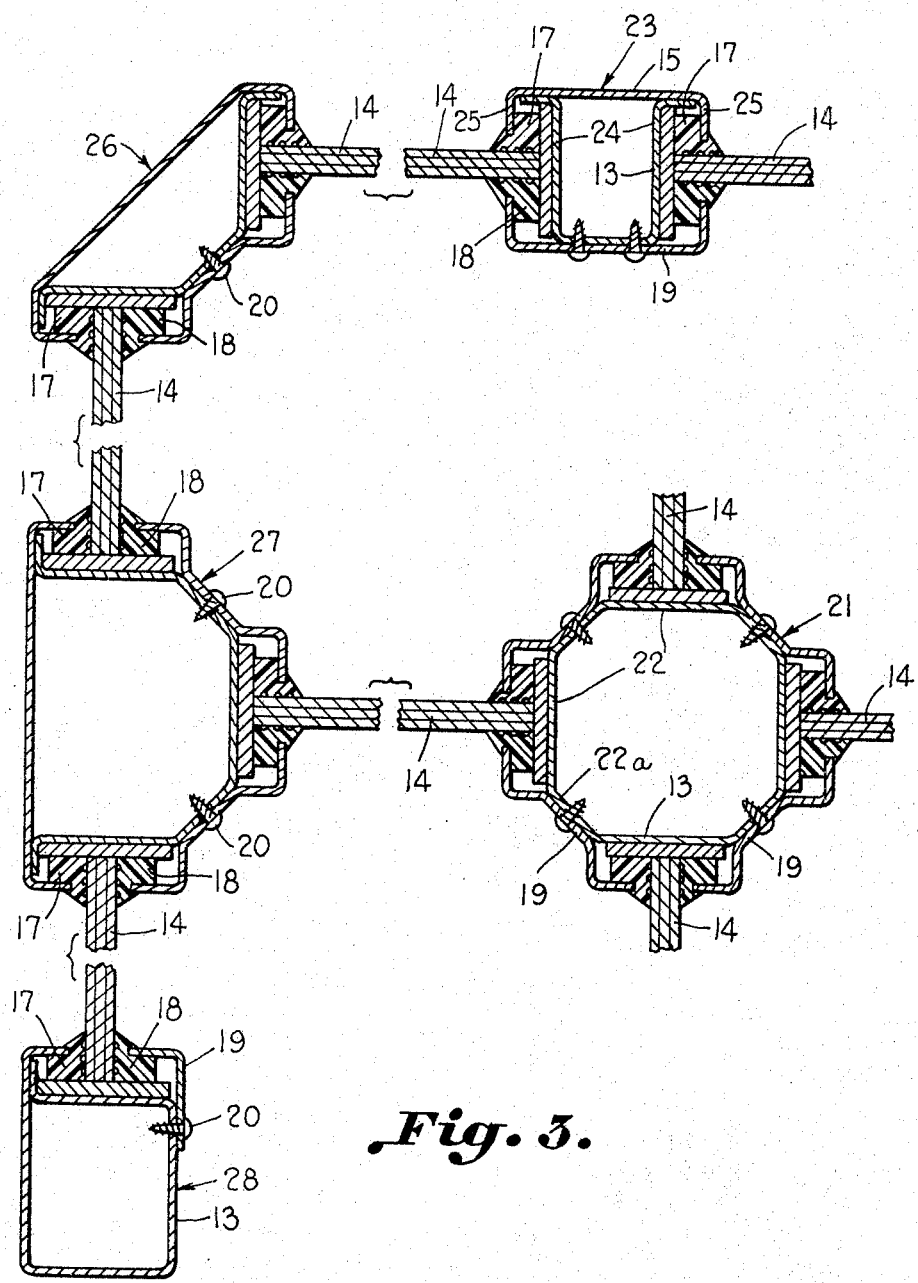
Fig. 3.
INVENTOR.
GEORGES L. DE RIDDER
BY
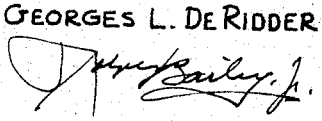
ATTORNEY

United States Patent Office 3,333,382
Patented Aug. 1, 1967

3,333,382
PANEL SUPPORTING FRAME STRUCTURES WITH INSULATING AND FASTENING STRIPS
Georges L. De Ridder, P.O. Box 373, Flat Rock, N.C. 28731
Filed Nov. 25, 1964, Ser. No. 413,913
Claims priority, application Belgium, Nov. 27, 1963, 640,498
2 Claims. (Cl. 52—501)

The invention relates to an improvement in windows, doors, frames, partitions, window walls, and the like including metallic sections.

Most of the known constructions for window, door, frame, partition, and window wall assemblies, and the like usually require shapes so complex that they can be made only by extrusion or molding. For this reason, such sections normally cannot be fabricated from stainless steel and are consequently made from aluminum, steel, or some other metallic or synthetic material. Moreover, those forms which are susceptible to the use of stainless steel in the above-mentioned assemblies are so designed as to render the fabrication thereof from stainless steel appreciably more expensive than most other metallic assemblies useful for a similar purpose. Stainless steel presents the advantage of being more rigid than most other metallic or synthetic materials and requires no maintenance after its placement.

An important object of this invention, therefore, is to provide such structures having a very simple form that can be made either by extrusion or from sections obtainable by rolling or folding and which can be relatively economically fabricated from stainless steel as well as aluminum or other metallic or synthetic materials.

It is another object of the invention to provide structures which, when composed of several sections, can be quickly assembled with such facility as to permit their compact storage when dissembled for shipment from the place of manufacture and at the same time to enable their assembly at the place of installation without the use of complicated or expensive tools or machinery or skilled labor.

Another important object of this invention is to provide structures which enable the quick and easy placement of complete assemblies and quick and easy means for removal and replacement of panels.

Another object of this invention is to provide structures which may serve for all of the frame or sash members of an assembly, whether they be horizontal or vertical.

Still another object of the invention is to provide a series of structures suitable for the installation of multiple panels, as in partitions, window walls, and the like.

A further object of the invention is to provide a seal or positive means of preventing the entrance of air and moisture where the panel is joined to the frame or sash.

Still another object of the invention is to provide structures having as an integral part of the structural unit a means for the installation of a system of weatherstripping which simultaneously provides effective and lasting weather insulation and serves as a guard avoiding damage as might result from the slamming of doors.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGURE 1 is a transverse cross-sectional view illustrating a member constructed in accordance with the present invention, FIGURE 2 is a transverse cross-sectional view illustrating a member constructed in accordance with a modified form of the invention, FIGURE 3 is a transverse cross-sectional view illustrating a series of members for the installation of multiple panels constructed in accordance with the present invention, FIGURE 4 is a transverse cross-sectional view illustrating a frame or sash and an abutment, FIGURE 5 is a transverse cross-sectional view illustrating the lower part of a sliding window, door, or partition, and FIGURE 6 is a perspective view illustrating a window assembly constructed in accordance with another modified form of the invention.

In the supporting frame structure illustrated in FIGURE 1, the member broadly designated at 10 is provided with support or base provided with outwardly extending portions adjacent the wall 11 which is attached to the wall 12. A shape 13 has a supporting portion 13a for receiving the glass 14, a portion extending inwardly toward the glass and a portion extending outwardly toward the wall. A section 15 is suitably fixed to the support 11 and to the shape 13 as by welding, not shown. The glass panel 14 is placed on a sealing strip 16 for holding it firmly in place. Sealing strips 17 and 18 are also provided. The sealing strips 17 and 18 are applied against the marginal portions of the panel 14 by the inturned portion 15a of the section 15 and by a fastening strip 19. An edge of the inturned portion 15a and an edge of an inturned portion 19a of the fastening strip 19 are inserted into slanting surfaces 17a and 18a providing a positive seal against the entrance of air and moisture. The strip 19 is attached to the member or assembly 10 as by longitudinally spaced screws 20 thus permitting the facile placement and removal of the panel 14.

In the structure illustrated in FIGURE 2, the fastening strip 19 has an outturned lower extension 19b carrying an upturned extension 19c which forms a gutter for receiving condensation on the inside of the window. The assembly 10 comprises a support 11, a shape 13 and a section 15. These members differ from the corresponding sections illustrated in FIGURE 1 in details as to shape and relative disposition, the means for mounting the panel 14 being identical to that illustrated in FIGURE 1.

In FIGURE 3 the assembly, broadly designated at 21, permits the installation of four panels 14. The assembly 21 comprises a single shape 13 having four supporting portions 22 for receiving the panels 14, said supporting portions 22 being separated by intermediate portions 22a on which fastening strips 19 are attached in order to hold the panels 14 in place in a fashion similar to that illustrated in FIGURE 1. The structure broadly designated at 23 in FIGURE 3 permits the installation of two panels 14 in a line one after the other. In this structure the shape 13 comprises two parallel portions 24 for receiving the panel 14. A section 15 has inturned portions 25 for positioning the sealing strips 17 against the panels 14. The fastening strip 19 holds the panels 14 in place in the manner described in FIGURE 1.

The structures broadly designated at 26 and 27, respectively, are two additional variants. The assembly 26 permits the installation of two panels 14 extending at a right angle to each other, whereas the assembly 27 permits the installation of three panels 14 extending at right angles.

In the assembly broadly designated at 28 the shape 13 is a single member. This structure is very simple and can be employed for either the horizontal or vertical bars of a frame or sash.

FIGURE 4 illustrates assemblies 29 and 30 having, as an integral part thereof, an effective means for the installation of strips of weatherstripping, said means being in the form of a dovetail notch to receive the base of the strip 31 and hold it firmly in place. This dovetail notch is formed from a portion 32 of a section 33 and a portion 34 of a second section 35. The sections 33 and 35 being secured together by suitable means such as welding, not shown.

FIGURE 5 illustrates another application of the means for the installation of strips of weatherstripping in accordance with the invention. A roller 36, rotatably mounted in the lower assembly of a sliding partition, or the like, moves along a rail broadly designated at 37. This rail 37 is provided with strips of weatherstripping 31 cooperating with sections 38 and 39 of the assembly. These strips 31 are held in dovetail notches formed by the marginal portions of two superimposed sections 40 and 41. The marginal portions 42 and 43 of section 40 and the opposing end portions 44 and 45 of section 35 incline toward one another at acute angles.

FIGURE 6 illustrates another modified form of the invention wherein the assembly broadly designated at 10 constitutes framing for a window. A shape 13 is provided with a notch 46 for holding weatherstripping 31. It will be noted that the shape 13 is a unitary member having a supporting portion 13a, a base wall 13b, and intermediate parallel sides 13c and 13d. A portion 13e extends upwardly from the support portion 13a and a portion 13f projects inwardly from the member 13e to be fastened to the rubber ceiling strip 17. The portions 13d and 13e are fixed together as by welding, not shown. A ceiling strip 16 is provided for supporting the glass 14. A rubber ceiling strip 18 is sutiably fastened as by glue (not shown) to the channel section illustrated at 47. The free ends of the legs of the channel section are turned upwardly as at 48. An upturned generally channel shaped member 49 is secured to the inside of the support portion 13a as by spaced screws 50. An intermediate portion of each of the legs of the channel shaped member 49 have a longitudinal rib as illustrated at 51. When the channel shaped fastening member 47 is pushed downwardly over the upturned channel shaped member 49 the edge portions 48 engage the rib 51 to lock the channel shaped member 47 thereon to firmly position the weatherstripping 18.

Thus, an improved structure for the installation or support of a glass pane or panel 14 including, a thin metal section has been provided. For example, with special reference to FIGURE 1, the thin metal section has a support 13a extending longitudinally of the glass panel and normal thereto. A first side member 13b extends outwardly from one edge of the support 13a. A base member 11 opposite said support is spaced therefrom. A second side member 15 extends from the base member opposite the first side member beyond the support. An insulating strip 16 is carried by the support extending between the glass panel and the support. A second insulating strip 17 between the glass panel and said second side portion extends beyond the support. An inturned portion 15a carried by said side portion extends beyond the support extending over at least a portion of said second insulating strip. A third insulating strip 18 is positioned on the side of said glass panel opposite said first insulating strip. A fastenng strip 19 positions said third insulating strip upon the support against the glass panel, and suitable means such as the screws 20 secure the fastening strip to the thin metal section.

It will be noted that the inturned portion 15a extends into said second insulating strip and that the second insulating strip tapers upwardly as at 17a to the glass panel. FIGURE 2 shows a gutter formed by the members 19b and 19c extending outwardly from said side member remote from the support to dispose of condensation on the inside of the glass panel. The insulating strips described above and shown in the drawings are preferably constructed of a suitable rubber like material such as neoprene.

The fastening strips illustrated in FIGURES 1 through 5 include an inwardly extending portion 19a carrying the third insulating strip. A portion such as is illustrated at 19d in FIGURE 1 overlies the first side and screws 20 fasten the overlying portion to the first side. The fastening strip illustrated in FIGURE 6 includes a first channel shaped strip 49 having upturned legs carried by the support opposite said third insulating strip. A second channel shaped strip 47 carries said third insulating strip and has downturned legs adapted to receive the upturned legs of first channel shaped strip. Interlocking means carried by said legs are provided in the form of grooves 59 and abutments 48 for retaining the second channel shaped strip upon the first channel shaped strip.

FIGURE 4 illustrates an outwardly extending portion carried by the second side beyond the base carrying an insulating strip 31. The first side has an inset portion illustrated at 31a adapted to receive an insulating strip carried by a structure complementary to that set forth herein. A dovetail notch formed by the inwardly tapering members 32 and 34 is carried by the outwardly extending portion carried by said second side beyond the base. The insulating strip carried therein is hollow and compressible as illustrated at 31.

A structure for the installation of a plurality of glass panels extending at substantially right angles to each other is illustrated in FIGURE 3. A thin metal section has a plurality of supports 13 extending longitudinally of respective glass panels and normal thereto. Elongated intermediate members join said supports. An insulating strip is carried by each support extending between the glass panel and the support with a second insulating strip extending between the glass panel and the adjacent intermediate member extending beyond the support. An inturned portion carried by said portion extending beyond the support extends into and is fixed within said second insulating strip. A third insulating strip is positioned on the side of said glass panel opposite said first insulating strip with a fastening strip positioning said third insulating strip upon the support against the glass panel. Means in the form of screws 20 secure the fastening strip to the thin metal section.

While a preferred embodiment of the invention has been described using specific terms, such description is for illustrative purposes only, and it is to be understood that changes and variations may be made without departing from the spirit or scope of the following claims.

What is claimed is:

1. A structure including a panel, wall and supporting frame, supporting frame comprising: a first integral thin metal shape including a support extending longitudinally of the panel and normal thereto, a thin side member extending inwardly from one edge of the support, and a thin side member extending outwardly from the other edge of the support toward said wall; a thin metal base member opposite said support being spaced therefrom and mounted on said wall, said base member having at least one outwardly extending portion adjacent the wall; a second integral thin metal shape including a thin wall section extending from the base member on a side thereof adjacent said one edge of the support and having a portion parallel to said outwardly extending thin side member extending beyond the support adjacent said inwardly extending thin side member, and an inturned portion integral therewith; said outwardly extending thin side member and said second integral metal shape attached to said base; an upper portion of said second integral metal shape attached to said inwardly extending thin side member; an insulating strip carried by the support extending between the panel and the support; a second insulating strip between the panel and said inturned portion; said inturned portion extending over at least a portion of said second insulating strip for holding said panel in position; a third insulating strip on the side of the panel opposite said second insulating strip; a thin wall fastening strip; a plurality of longitudinally spaced screws fastening said thin wall fastening strip to said first intgeral thin metal shape; and a portion carried by said fastening strip positioning said third insulating strip upon the support against the panel.

2. A structure including a panel and a thin metal section having, a support extending longitudinally of the panel and normal thereto, a first side member extending outwardly from one edge of the support, a base member opposite said support being spaced therefrom, a second side member extending from the base member opposite the first side member beyond the support, an insulating strip carried by the support extending between the panel and the support, a second insulating strip between the panel and said second side member extending beyond the support, an inturned portion carried by said second side member extending beyond the support over at least a portion of said second insulating strip, a third insulating strip on the side of said panel opposite said second insulating strip, a fastening strip positioning said third insulating strip upon the support against the panel, means securing the fastening strip to the thin metal section, an outwardly extending portion carried by said second metal shape beyond said base member, an insulating strip carried by said outwardly extending portion and wherein said first metal shape has an insert portion adapted to receive an insulating strip carried by a structure complementary to that set forth herein.

References Cited

UNITED STATES PATENTS

| | | | |
|---|---|---|---|
| 1,027,675 | 5/1912 | Viberg | 52—499 X |
| 2,085,281 | 6/1937 | Wagoner | 52—403 X |
| 2,097,988 | 11/1937 | Ross | 52—288 |
| 2,589,517 | 3/1952 | Stelzer | 52—501 X |
| 2,889,585 | 6/1959 | Le Bon | 49—495 X |
| 3,016,993 | 1/1962 | Owen | 52—502 X |
| 3,090,085 | 5/1963 | Brown | 52—498 X |
| 3,220,062 | 11/1965 | Hermann | 52—502 X |

FOREIGN PATENTS

| | | |
|---|---|---|
| 763,485 | 1934 | France. |
| 1,332,963 | 6/1963 | France. |

JOHN E. MURTAGH, *Primary Examiner.*